United States Patent Office 3,193,454
Patented July 6, 1965

3,193,454
INSECTICIDAL OIL-SOLUBLE CHLORINATED
SUBSTITUTED IMIDAZOLINES
Jack F. Bussert, Calumet City, Ill., assignor to Standard
Oil Company, Chicago, Ill., a corporation of Indiana
No Drawing. Filed Apr. 27, 1959, Ser. No. 808,883
13 Claims. (Cl. 167—33)

This invention relates to novel oil-soluble chlorinated substituted imidazolines. This invention further relates to insecticidal compositions containing chlorinated substituted imidazolines which are particularly useful in destroying noxious roaches.

It has been long established that hydrocarbon oils in themselves, although they exhibit some insecticidal action, are not efficient in commercial operations for destroying harmful insects. Hydrocarbon oils alone employed in sufficient amounts to control insects are very costly and do not penetrate the waxy coatings on such pests as roaches for maximum killing, but rather depend largely upon covering such pests to the extent necessary to cut off their air supply. Hence, many such pests survive treatment with hydrocarbon oils. Lately, the insecticide art has developed a number of insecticidal additives to be employed in hydrocarbon oil carriers or other insecticide carriers. However, many such additives are particularly ineffective against roaches and other insect-like pests having tough waxy coverings. Further, many of the more common insecticides, such as DDT, lindane, toxaphene, chlordane, etc. now in commercial use are expensive to produce and therefore have economic drawbacks in their commercial application.

I have discovered certain new oil-soluble chlorinated substituted imidazolines which are useful as insecticides and particularly against roaches and which are derived from relatively inexpensive starting materials. Of particular use as insecticides, in accordance herewith, are the chlorinated substituted imidazolines and chlorinated substituted bis-imidazolines prepared by the reaction of an unsaturated essentially straight chaincarboxylic acid having from about 11 to about 19 carbon atoms with an ethylene polyamine having from about 2 to about 20 and preferably from about 2 to about 8 carbon atoms and from 2 to 5 amino groups and chlorinating the resulting imidazoline product at the unsaturated double bond.

The substituted imidazolines and substituted bis-imidazolines may be prepared by reacting the carboxylic acid with the ethylene polyamine at a temperature in the range of from about 40 to about 300° C. and preferably from about 100 to about 200° C. The reaction is usually complete within 20 hours. Sufficient carboxylic acid should be used to react one carboxy group with each separate ethylene diamine group of the ethylene polyamine. Thus, where the ethylene polyamine is a diamine or triamine or where the ethylene polyamine is a tetramine or pentamine and it is desired to form a substituted imidazoline which is not a bis-imidazoline, approximately equimolar amounts of acid and polyamine are used in the reaction; however, where the ethylene polyamine is a tetramine or pentamine and it is desired to form a substituted bis-imidazoline, two moles of acid should be used per mole of polyamine. The substituted imidazolines and substituted bis-imidazolines which may be formed in accordance with the above and which are useful in forming insecticide compositions by subsequent chlorination at the unsaturated carbon-to-carbon linkages are those compounds corresponding to the following structure formula:

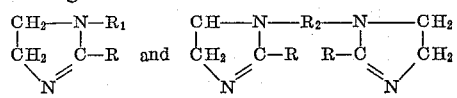

wherein R represents an unsaturated hydrocarbon radical having from about 10 to about 18 carbon atoms and preferably about 17 carbon atoms, $R_1$ represents hydrogen or nitrogen- or hydroxy-containing hydrocarbon radicals such as amino alkyl, hydroxy alkyl, alkyl amino alkyl, azaalkyl, aminoaza alkyl, etc., having less than about 19 carbon atoms and preferably less than 7 carbon atoms, and $R_2$ is a linking chain between imidazoline rings at the saturated nitrogen position and essentially contains from 2 to 4 carbon atoms and 0 to 1 nitrogen atom inclusively in the linking chain. The linking chain may have side chain substituents having up to about 14 carbon atoms including hydrocarbon groups, hydroxy groups, amino groups, halogen groups, and the like, but such substituents are neither necessary nor preferred. $R_2$ is preferably a $(CH_2)_n$ radical or an alkylaminoalkyl radical and particularly —$CH_2CH_2$— or ethyl amino ethyl.

The carboxylic acids which may be used in forming the substituted imidazolines and substituted bis-imidazolines are the unsaturated hydrocarbon straight chain acids having from about 11 to about 18 carbon atoms and having at least one unsaturated carbon-to-carbon bond. Examples of useable acids are undecenoic acid, dodecenoic acid, dodecendioic acid, tridecenoic acid, pentadecenoic acid, heptadecenoic acid, oleic acid, linoleic acid, and linolenic acid. Because of their commercial availability and low cost, the unsaturated acids having 18 carbon atoms, i.e. oleic, linoleic and linolenic, are preferred.

The ethylene polyamines which may be used in the above preparation may be a substituted or an unsubstituted ethylene polyamine which may have substituents having from 2 to 20 carbon atoms and preferably 2 to 8 carbon atoms and may contain amino, hydroxy, halogen and hydrocarbon substituents, and the like. Such polyamines include ethylene diamines, diethylene triamines, ethylene tetramines, triethylene tetramines, tetraethylene pentamines, etc. Specific examples of substituted ethylene polyamines are ethyl ethylenediamine, amyl ethylenediamine, octyl ethylenediamine, octylene ethylenediamine, dodecylethylenediamine, hexadecyl ethylenediamine, heptadecyl ethylenediamine, octadecyl ethylene diamine, eicosyl ethylenediamine, hydroxyethyl ethylenediamine, N-n-dodecyl diethylene triamine, N-hydroxy decyl diethylene triamine, aminoethyl ethylenediamine, hydroxyheptadecyl ethylene-diamine, aminododecyl ethylenediamine, N-octyl triethylene tetramine, N-amyl tetraethylene pentamine, benzyl ethylenediamine, and the like.

To provide the insecticidally active roach-killing compositions of this invention, the unsaturated substituted imidazolines and bis-imidazolines prepared above are chlorinated at the unsaturated carbon-to-carbon bonds in the unsaturated substituent derived from the unsaturated carboxylic acid. Accordingly, the substituted imidazolines or substituted bis-imidazoline is dissolved in a suitable solvent such as, for example, chloroform. The solution is placed in a reaction vessel fitted with a reflux condenser and chlorine gas inlet means. The solution is then heated to the solvent reflux temperature. The solvent should be such as to provide a reflux temperature in the range of from about 140° F. to about 270° F. and preferably from about 140° F. to about 170° F. Higher or lower chlorination temperatures may be used particularly within the range of from about 100° F. to about 400° F. The solution is heated to reflux conditions and maintained at reflux temperature while chlorine is bubbled through the solution. For chlorination of the imidazoline compounds, the chlorine is bubbled through the heated solution in amounts sufficient to provide two chlorine substituents for each unsaturated bond. An excess of chlorine should be used to insure fairly complete chlorination. Chlorine which has been bubbled through the solution may be withdrawn through the reflux condenser and recycled to the chlorine gas inlet to be bubbled through the solution again. Such recycle of chlorine cuts down the amount of chlorine excess needed and also diminishes chlorine disposal problems. Chlorination may take from 10 to 48 hours; however, the chlorination is usually complete within 16 hours.

The oil-soluble chlorinated substituted imidazoline compounds defined above may be used as active ingredients in amounts of from about 0.01 to about 20 weight percent and preferably from about 0.025 to about 5.0 weight percent with an insecticide carrier which is substantially inert toward the chlorinated substituted imidazoline compounds. The useful carriers are solvents, emulsifiable concentrates in admixture with water and solid carriers. The solvent carriers which may be used are such fluids as acetone, xylene, benzene, petroleum distillates in the distillation range of furnace oils and kerosenes, and other normally liquid hydrocarbons. When used with a solvent carrier, the compositions are dissolved in the solvent and sprayed directly on the vegetation of the area where insect control is desired, such as by thermal fog generators. Amounts of the carbylamines used in solvent carriers are from about 0.01 to about 10 weight percent and preferably from about 0.025 to about 5.0 weight percent. Emulsifiable concentrates may be prepared by adding the oil-soluble chlorinated substituted imidazoline compounds to an oleaginous solvent, such as furnace oil or other hydrocarbons, in amounts of from about 10 to about 75 weight percent and preferably from about 25 to about 50 weight percent. At the time of application, the emulsifiable concentrate is mixed with from about 95 to 99.9 and preferably 99 to 99.8 weight percent of water sufficient to dilute the active ingredient content to from about .005 to about 10 weight percent and preferably from about .01 to about 4.0 weight percent and applied in the resulting emulsion. An emulsifying agent may advantageously be added. If it is desired to dust an area with the insecticide, the insecticide is impregnated on a solid carrier. The solid carrier is an inert solid carrier such as talc, pumice, silt, celites, chalk, wood flour, and clays such as fuller's earth, china clay, kaolin, celite or bentonite. The insecticidal chlorinated substituted imidazoline compounds are impregnated on the solid carrier by preparing a concentrated solution of the compound in a suitable volatile solvent such as acetone, mixing the dissolved compound with the solvent carrier and allowing the mixture to evaporate leaving the insecticidal compound in amounts of from about 1 to 20 and preferably 5 to 10 weight percent on the solid carrier. It is not necessary that the solid carrier be completely inert but it should be inert with respect to detrimental effects to plant life; thus the carrier may even be a pesticidal composition in itself or a solid fertilizing or nutrient composition.

The following examples illustrate the preparation of particularly advantageously insecticidally active compositions in accordance with this invention, which compositions are particularly useful against roaches. The compositions are prepared by chlorinating the unsaturated substituted chains of the substituted imidazoline.

EXAMPLE I 140 g. of oleic acid and 52 g. of 2-hydroxyethylethylene diamine were dissolved in 250 ml. of xylene solvent. The resulting solution was heated in a flask fitted within a Dean and Stark receiver on a condenser to the reflux temperature of the solvent (about 140° C.) and the temperature was maintained in the range of solvent reflux conditions for about 20 hours. The 20 hours were required to obtain 18.75 ml. of $H_2O$, about the theoretical quantity for complete imidazoline formation. The resulting product was evaporated on a steam bath with an air stream to remove solvent. The resulting composition was a highly viscous semi-solid having a light tan color. Yield was 202 g. of nearly quantitative yield of crude 1-hydroxyethyl-2-heptadecenyl-2-imidazoline. 70 g. of the crude 1-hydroxyethyl-2-heptadecenyl-2-imidazoline was dissolved in 200 ml. of chloroform in a flask fitted with a reflux condenser and a gas inlet tube and heated to a temperature of about 62° C. and refluxed at about that temperature for about 15 hours while chlorine was bubbled through the solution. The chloroform was then evaporated from the resulting product. The product was chlorinated 1-hydroxyethyl-2-heptadecenyl-2-imidazoline having a chlorine content of 44 weight percent. Yield was 125 g.

EXAMPLE II 188 g. of oleic acid and 63 g. of tetraetylene pentamine were dissolved in 200 ml. of benzene solvent. The resulting solution was heated in the apparatus described in Example 1 to the reflux temperature of the solvent (about 80° C.) and the temperature was maintained in the range of solvent reflux conditions for about 20 hours. The 20 hours were required to obtain 24 ml. of $H_2O$, about the theoretical quantity for complete imidazoline formation. The resulting product was evaporated on a steam bath with an air stream to remove solvent. The resulting composition was a highly viscous semi-solid having a light brown color. Yield was 210 g. or nearly quantitative yield of crude, 1,5-bis(2'-heptadecenyl-2'-imidazolino-1'-)-3 azapentane. 136 g. of the 1,5-bis(2'-heptadecenyl-2'-imidazolino-1'-)-3 azapentane were dissolved in 200 ml. of chloroform in a flask fitted with a reflux condenser and a gas inlet tube and heated to a temperature of about 62° C. and refluxed at about that temperature for about 16 hours while chlorine was bubbled through the solution. The chloroform was then evaporated from the resulting product. The product was chlorinated 1,5-bis(2'-heptadecenyl-2'-imidazolino-1'-)-3-azapentane having a chlorine content of 37.2 weight percent. Yield was 215 grams.

EXAMPLE III 141 g. of oleic acid and 30 g. of ethylenediamine were dissolved in 250 ml. of xylene solvent. The resulting solution was heated in the apparatus described in Example I to the reflux temperature of the solvent reflux conditions for about 20 hours. The 20 hours were required to obtain 18 ml. of $H_2O$, about the theoretical quantity for complete imidazoline formation. The resulting product was evaporated on a steam bath with an air stream to remove solvent. The resulting composition was a highly viscous semi-solvent having a tan color. Yield was about 200 g. or nearly quantitative yield of crude 2-heptadecenyl-2-imidazoline. The crude 2-heptadecenyl-2-imidazoline may be dissolved in 400 ml. of chloroform in a flask fitted with a reflux condenser and a gas inlet tube and heated to a temperature of about 62° C. and refluxed at about that temperature for about 16 hours while chlorine is bubbled through the solution. The chloroform may then be evaporated from the resulting product. The product is chlorinated 2-heptadecenyl-2-imidazoline.

EXAMPLE IV 141 g. of oleic acid and 52 g. of β-aminoethyl ethylene diamine were dissolved in 250 ml. of benzene solvent. The resulting solution was heated in the apparatus described in Example I to the reflux temperature of the solvent (about 80° C.) and the temperature was maintained in the range of solvent reflux conditions for about 20 hours. The 20 hours were required to obtain 18 ml. of $H_2O$, about the theoretical quantity for complete imidazoline formation. The resulting product was evaporated on a steam bath with an air stream to remove solvent. The resulting composition was a highly viscous semi-solid having a light brown color. Yield was 220 g. or nearly quantitative yield of crue 1-aminoethyl-2-heptadecenyl-2-imidazoline. The crude 1-aminoethyl-2-heptadecenyl-2-imidazoline may be dissolved in 400 ml. of chloroform in a flask fitted with a reflux condenser and a gas inlet tube and heated to a temperature of about 62° C. and refluxed at about that temperature for about 18 hours while chlorine is bubbled through the solution. The chloroform may then be evaporated from the resulting product. The product is chlorinated 1-aminoethyl-2-heptadecenyl-2-imidazoline.

EXAMPLE V 141 g. of oleic acid and 73 g. of triethylene tetramine were dissolved in 250 ml. of xylene solvent. The resulting solution was heated in the apparatus described in Example I to the reflux temperature of the solvent (about 140° C.) and the temperature was maintained in the range of solvent reflux conditions for about 24 hours. The 24 hours were required to obtain 18+ ml. of $H_2O$, about the theoretical quantity for complete imidazoline formation. The resulting product was evaporated on a steam bath with an air stream to remove solvent. The resulting composition was a highly viscous semi-solid having a brown color. Yield was 240 g. or nearly quantitative yield of crude 1-(5'-amino-3'-azopentyl)-2-heptadecenyl-2-imidazoline. The crude 1-(5'-amino-3'-azopentyl)-2-heptadecenyl-2-imidazoline may be dissolved in 400 ml. of chloroform in a flask fitted with a reflux condenser and a gas inlet tube and heated to a temperature of about 62° C. and refluxed at about that temperature for about 20 hours while chlorine is bubbled through the solution. The chloroform may then be evaporated from the resulting product. The product is chlorinated 1-(5'-amino-3'-azopentyl)-2-heptadecenyl-2-imidazoline.

EXAMPLE VI 150 g. of oleic acid and 100 g. of tetraethylene pentamine were dissolved in 200 ml. of xylene solvent. The resulting solution was heated in the apparatus described in Example I to the reflux temperature of the solvent (about 140° C.) and the temperature was maintained in the range of solvent reflux conditions for about 24 hours. The 24 hours were required to obtained 18 ml. of $H_2O$, about the theoretical quantity for complete imidazoline formation. The resulting product was evaporated on a bath with an air stream to remove solvent. The resulting composition was a highly viscous semi-solid having a light brown color. Yield was 240 g. or nearly quantitative yield of crude 1-(8'-amino-3',6'-diazooctyl)-2-heptadecenyl-2-imidazoline. 80 g. of the crude 1-(8'-amino-3',6'-diazooctyl)-2-heptadecenyl-2-imidazoline may be dissolved in 200 ml. of chloroform in a flask fitted with a reflux condenser and a gas inlet tube and heated to a temperature of about 62° C. and refluxed at about that temperature for about 16 hours while chlorine is bubbled through the solution. The chloroform may then be evaporated from the resulting product. The product is chlorinated 1-(8'-amino-3',6'-diazooctyl)-2-heptadecenyl-2-imidazoline.

EXAMPLE VII 282 g. of oleic acid and 52 g. of triethylene tetramine were dissolved in 400 ml. of xylene solvent. The resulting solution was heated in the apparatus described in Example I to the reflux temperature of the solvent (about 140° C.) and the temperature was maintained in the range of solvent reflux conditions for about 20 hours. The 20 hours were required to obtain 36 ml. of $H_2O$, about the theoretical quantity for complete imidazoline formation. The resulting product was evaporated on a steam bath with an air stream to remove solvent. The resulting composition was a highly viscous semi-solid having a dark brown color. Yield was 220 g. or nearly quantitative yield of crude bis(1-methylene-2-heptadecenyl-2-imidazoline) 100 g. of which may be dissolved in 150 ml. of chloroform in a flask fitted with a reflux condenser and a gas inlet tube and heated to a temperature of about 62° C. and refluxed at about that temperature for about 15 hours while chlorine is bubbled through the solution. The chloroform may then be evaporated from the resulting product. The product is chlorinated bis(1-methylene-2-heptadecenyl-2-imidazoline).

EXAMPLE VIII 70 g. of linoleic acid and 48 g. of tetraethylene pentamine were dissolved in 200 ml. of dry xylene solvent. The resulting solution was heated in the apparatus described in Example I to the reflux temperature of the solvent (about 140° C.) and the temperature was maintained in the range of solvent reflux conditions for about 12 hours. The 12 hours were required to obtain 8.7 ml. of $H_2O$, about the theoretical quantity for complete imidazoline formation. The resulting product was evaporated on a steam bath with an air stream to remove solvent. The resulting composition was a highly viscous semi-solid having a brown color. Yield was 121 g. of nearly quantitative yield of crude 8'-amino-3',6'-diazooctyl - 2 - heptadecadienyl - 2 - imidazoline. The crude 8' - amino - 3',6' - diazooctyl - 2 - heptadecadienyl - 2 - imidazoline may be dissolved in 250 ml. of chloroform in a flask fitted with a reflux condenser and a gas inlet tube and heated to a temperature of about 62° C. and refluxed at about that temperature for about 20 hours while chlorine is bubbled through the solution. The chloroform may then be evaporated from the resulting product. The product is chlorinated 8'-amino-3',6'-diazooctyl-2-heptadecadienyl-2-imidazoline.

*Oriental roach test.*—To illustrate the effectiveness of the insecticidal compositions of this invention having the chlorinated substituted imidazoline and chlorinated substituted bis-imidazolines as active ingredients as roach killers, the Oriental roach test was carried out as follows: Ten Oriental roaches were placed in an enclosure and subjected to the action of 0.5 cc. of the sample tested (compositions given below) by contact spray with a Pete-Grady gun operating under 10 p.s.i.g. air line pressure. After spraying, the Oriental roaches were kept in the enclosure for 72 hours at the end of which period the numbers of roaches dead and alive were counted. The test was repeated and from calculations based on the total number dead and total number alive from both tests, the roach-killing activity was determined as the total percent dead. The following samples were tested with the results indicated in Table I, below.

Sample A—Acetone containing 5.0 weight percent of the composition of Example I.
Sample B—Acetone containing 0.25 weight percent of the composition of Example I.
Sample C—Acetone containing 5.0 weight percent of the composition of Example II.
Sample D—Acetone containing 0.25 weight percent of the composition of Example I.

*Table I*

BIOLOGICAL ACTIVITY AS ROACH TOXICANT

| Sample: | Percent roaches killed |
|---|---|
| A | 100 |
| B | 96 |
| C | 100 |
| D | 100 |

In contrast to the above compositions, a composition consisting of 5% unchlorinated 1,5-bis(2'-heptadecenyl-2'-imidazoline-1'-)-3-azapentane in acetone when used in accordance with the above Oriental roach test procedure, killed only 50% of the roaches.

BIOLOGICAL ACTIVITY AGAINST MITES AND APHIDS

To illustrate further insecticidal properties of compositions of this invention, the following samples were prepared and tested for biological activity against two-spotted mites and aphids as indicated below:

Sample E—Acetone containing 0.025 weight percent of the composition of Example I.
Sample F—Acetone containing 0.05 weight percent of the compositions of Example I.
Sample G—Acetone containing 0.1 weight percent of the composition of Example I.
Sample H—Acetone containing 0.2 weight percent of the composition of Example I.
Sample J—Acetone containing 0.05 weight percent of the composition of Example II.
Sample K—Acetone containing 0.1 weight percent of the composition of Example II.
Sample L—Acetone containing 0.2 weight percent of the composition of Example II.

*Two-spotted spider mite test.*—A variable number of two-spotted spider mites in the nymph and adult stage on infested bean leaves were subjected to the action of the poisons of Samples E and G by contact spray with a Pete-Grady gun at 5 p.s.i.g. air line pressure. The infested bean leaves were placed in an enclosure during and after contact and were sprayed to wetting with the sample to be tested. At the end of 24 hours for each test the numbers dead and alive two-spotted spider mites were counted. The total number of dead with respect to the total number of two-spotted spider mites subjected to the test was used to compute the percent dead reported in Table II as indication of the biological activity.

Table II

BIOLOGICAL ACTIVITY AGAINST TWO-SPOTTED SPIDER MITES

| Sample: | Biological activity (percent dead) |
|---|---|
| E | 98 |
| G | 98 |

*Green peach aphid test.*—A variable number of green peach aphids in the nymph and adult stage on infested cotton plants were subjected to the action of the poisons of Samples F, G, H, J, K and L by contact spray with a Pete-Grady gun at 5 p.s.i.g. air line pressure. The infested cotton plants were kept in an enclosure during and after contact and were sprayed to wetting with the sample under test. At the end of 24 hours for each test, the numbers dead and alive green peach aphids were counted. The test on each sample was repeated. The total number dead with respect to the total number of green peach aphids subjected to each sample was used to compute the percent dead reported in Table III as an indication of biological activity against green peach aphids.

Table III

BIOLOGICAL ACTIVITY AGAINST GREEN PEACH APHIDS

| Sample: | Biological activity (percent dead) |
|---|---|
| F | 83 |
| G | 100 |
| H | 100 |
| J | 100 |
| K | 100 |
| L | 99 |

In the two-spotted mite test, phytotoxicity of the compositions against bean leaves was investigated and it was found that no phytotoxicity was exhibited in compositions containing the insecticidally active ingredient in amounts of 0.1 weight percent or less.

It is evident from the above that I have provided new insecticide compositions particularly useful as roach killers. Such compositions as I have provided contain, as an active ingredient, an oil-soluble chlorinated substituted imidazoline compound as hereinabove defined.

I claim:

1. A pesticide composition comprising an oil-soluble active ingredient prepared by chlorinating at carbon-to-carbon unsaturation, at a temperature in the range of from about 100 to about 400° F., a substituted imidazoline compound having a formula selected from the class consisting of:

$$\begin{array}{c} CH_2—N—R_1 \\ | \quad\quad | \\ CH_2 \quad C—R \\ \diagdown\;\;\diagup \\ N \end{array}$$

and $$\begin{array}{c} CH_2—N——R_2——N———CH_2 \\ |\quad\quad|\quad\quad\quad|\quad\quad| \\ CH_2\;\;C—R\;\;R—C\;\;CH_2 \\ \diagdown\;\diagup\quad\quad\diagdown\;\diagup \\ N\quad\quad\quad\quad N \end{array}$$

wherein R is acyclic hydrocarbon containing 1–2 carbon-to-carbon unsaturation bonds and having from about 10 to about 18 carbon atoms, $R_1$ is selected from the group consisting of hydrogen, acyclic saturated aminohydrocarbon having fewer than about 7 carbon atoms, and acyclic saturated hydroxy-hydrocarbon having fewer than about 7 carbon atoms, and $R_2$ has the formula $(CH_2)_a N_b (CH_2)_a$ where $a$ is an integer of 1 to 2 inclusive and $b$ is 0 to 1, said chlorinating resulting in introduction of chlorine in said unsaturated hydrocarbon radical at the unsaturated carbon-to-carbon bond, and an insecticide carrier which is substantially inert with respect to said active ingredient, the amount of said active ingredient being sufficient to effect the desired pesticide action.

2. The pesticide composition of claim 1 wherein said substituted imidazoline compound has the formula:

$$\begin{array}{c} CH_2—N——R_2——N———CH_2 \\ |\quad\quad|\quad\quad\quad|\quad\quad| \\ CH_2\;\;C—R\;\;R—C\;\;CH_2 \\ \diagdown\;\diagup\quad\quad\diagdown\;\diagup \\ N\quad\quad\quad\quad N \end{array}$$

wherein R contains about 17 carbon atoms.

3. The pesticide composition of claim 1 wherein said substituted imidazoline compound has the formula:

$$\begin{array}{c} CH_2—N—R_1 \\ | \quad\quad | \\ CH_2 \quad C—R \\ \diagdown\;\;\diagup \\ N \end{array}$$

and R contains about 17 carbon atoms.

4. A pesticidal composition comprising from about 0.01 to about 20 weight percent of oil-soluble chlorinated 1-hydroxyethyl-2-heptadecenyl-2-imidazoline, containing chlorine on a carbon atom corresponding to the unsaturated carbon-to-carbon bond of the heptadecenyl group prepared by chlorinating 1-hydroxyethyl-2-heptadecenyl-2-imidazoline at the carbon-to-carbon unsaturation at a temperature in the range of from about 100 to about 400° F. as an essential active ingredient and a carrier which is substantially inert with respect to said ingredient.

5. A pesticidal composition comprising from about 0.01 to about 20 weight percent of oil-soluble chlorinated 1,5-bis(2'-heptadecenyl-2'-imidazolino-1'-)-3-azapentane, containing chlorine on a carbon atom corresponding to the unsaturated carbon-to-carbon bond of the heptadecenyl groups, prepared by chlorinating 1,5-bis(2'-heptadecenyl-2'-imidazoline-1'-)-3-azapentane at the carbon-to-carbon unsaturation at a temperature in the range from about 100 to about 400° F. as an essential active ingredient and a carrier which is substantially inert with respect to said ingredient.

6. The pesticide composition of claim 1 wherein R contains about 17 carbon atoms and $R_2$ is ethylene.

7. The pesticide composition of claim 1 wherein R contains about 17 carbon atoms and $R_2$ is ethylaminoethyl.

8. The pesticide composition of claim 1 wherein R contains about 17 carbon atoms and $R_1$ is hydrogen.

9. The pesticide composition of claim 1 wherein R contains about 17 carbon atoms and $R_1$ is acyclic saturated amino-hydrocarbon having fewer than about 7 carbon atoms.

10. The pesticide composition of claim 1 wherein R contains about 17 carbon atoms and $R_1$ is acyclic saturated hydroxy-hydrocarbon having fewer than about 7 carbon atoms.

11. A method of killing insects which comprises contacting the insects with an insecticidely active ingredient prepared by chlorinating at the carbon-to-carbon unsaturation at a temperature in the range of from about 100° to about 400° F., a substituted imidazoline compound having a formula selected from the class consisting of:

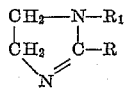

and

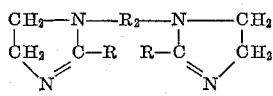

wherein R is acyclic hydrocarbon containing 1-2 carbon-to-carbon unsaturation bonds and having from about 10 to about 18 carbon atoms, $R_1$ is selected from the group consisting of hydrogen, acyclic saturated amino-hydrocarbon having fewer than 7 carbon atoms, and acyclic saturated hydroxy-hydrocarbon having fewer than about 7 carbon atoms, and $R_2$ has the formula $(CH_2)_a N_b (CH_2)_a$ where $a$ is an integer of 1 to 2 inclusive and $b$ is 0 to 1, said chlorinating resulting in introduction of chlorine in said unsaturated hydrocarbon radical at the unsaturated carbon-to-carbon bond, the amount of said active ingredient being sufficient to effect the desired pesticide action.

12. The method of claim 11 wherein said insecticidal active ingredient is prepared by chlorinating a substituted imidazoline compound having the formula:

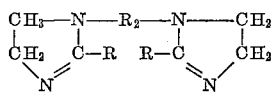

wherein R contains about 17 carbon atoms.

13. The method of claim 11 wherein said insecticidal active ingredient is prepared by chlorinating a substituted imidazoline compound having the formula:

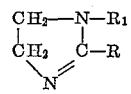

wherein R contains about 17 carbon atoms.

References Cited by the Examiner
UNITED STATES PATENTS

| | | | |
|---|---|---|---|
| Re. 23,227 | 5/50 | Blair | 252—8.55 |
| 2,194,419 | 3/40 | Chwala | 167—33 |
| 2,399,601 | 4/46 | Kyrides | 167—33 |
| 2,540,170 | 2/51 | Law | 167—33 |
| 2,819,284 | 1/58 | Shen | 167—33 |

OTHER REFERENCES

King: U.S. Dept. Agr. Handbook (No. 69, Chemicals Evaluated As Insecticides (pages 1–18 and 196) May 1954.

JULIAN S. LEVITT, *Primary Examiner*.

M. O. WOLK, LEWIS GOTTS, *Examiners*.